(12) United States Patent
Boyl-Davis et al.

(10) Patent No.: US 7,974,722 B2
(45) Date of Patent: Jul. 5, 2011

(54) METHODS AND SYSTEMS FOR PROCESSING SURFACE DATA FOR THE MANUFACTURING OF OPTIMUM FIT MATING PARTS

(75) Inventors: Theodore M. Boyl-Davis, Snohomish, WA (US); Darrell Darwin Jones, Mill Creek, WA (US); Dario I. Valenzuela, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/577,409

(22) Filed: Oct. 12, 2009

(65) Prior Publication Data

US 2011/0087358 A1 Apr. 14, 2011

(51) Int. Cl.
*G06F 19/00* (2006.01)
*B29C 45/14* (2006.01)
*G06T 17/00* (2006.01)
*G06T 15/40* (2006.01)
*G06K 9/00* (2006.01)

(52) U.S. Cl. ............ 700/98; 700/97; 700/118; 700/163; 700/182; 700/195; 264/515; 264/516; 345/420; 345/421; 382/154

(58) Field of Classification Search .............. 700/97–98, 700/118, 163, 182, 195; 264/512, 515–516; 345/419–421; 382/154
See application file for complete search history.

(56) References Cited

U.S. PATENT DOCUMENTS

| | | | | |
|---|---|---|---|---|
| 5,737,090 | A * | 4/1998 | Christopher et al. | 358/3.29 |
| 5,898,494 | A * | 4/1999 | Csipkes | 356/511 |
| 6,430,796 | B1 * | 8/2002 | Jones et al. | 29/243.53 |
| 7,058,213 | B2 * | 6/2006 | Rubbert et al. | 382/128 |
| 7,571,054 | B2 * | 8/2009 | Newman | 702/6 |
| 2006/0281041 | A1 * | 12/2006 | Rubbert et al. | 433/24 |
| 2007/0081718 | A1 * | 4/2007 | Rubbert et al. | 382/154 |
| 2007/0299338 | A1 * | 12/2007 | Stevick et al. | 600/425 |
| 2009/0101851 | A1 * | 4/2009 | Spalding | 250/559.12 |
| 2009/0103113 | A1 * | 4/2009 | Nygaard et al. | 356/640 |

* cited by examiner

*Primary Examiner* — Ramesh B Patel
(74) *Attorney, Agent, or Firm* — Armstrong Teasdale LLP (57) ABSTRACT

A computer-based method for defining a surface of a part for placement adjacent a mating surface of a base part is described. The method includes receiving raw data which defines the mating surface of the base part, smoothing the raw data, generating a stable reference frame consisting of at least one of a substantially smooth curve and surface based on the smoothed raw data, calculating a dimensional offset curve or surface using the smoothed raw data and the stable reference frame curve or surface by referencing any peaks in the smoothed raw data within a predefined range of a corresponding point in the stable reference frame curve or surface, smoothing the dimensional offset curve or surface, and outputting the dimensional offset curve or surface for utilization in fabricating the part that is to be adjacent the base part.

21 Claims, 9 Drawing Sheets

FIG. 1

PRIOR ART

METHODS AND SYSTEMS FOR PROCESSING SURFACE DATA FOR THE MANUFACTURING OF OPTIMUM FIT MATING PARTS

BACKGROUND

The field of the invention relates generally to fitting of mating parts, and more specifically, to methods and systems for processing surface data for optimum fit of a mating part.

Certain surface profiles that relate to matched assembly of cured composite parts include a requirement that the post cured part surfaces have a flush fit, with a small gap, for example, less then a 0.005 inch gap overall along all contact locations. The flush fit and small gap operate to reduce and/or prevent damage to the laminates when the parts are fastened together and/or are load bearing. It should be noted that the flush fit and small gap mentioned herein that are desired in such mating parts are not limited to cured composite parts and that such a flush fit may be desired for other types of surface to surface combinations.

However, cured composite surfaces typically reflect effects of the cure operation, which may include, for example, bagging film folds. Known methods of data surfacing to create a blended or smoothed surfaces that intersect or cut through all bumps or steps result in mating parts which may have an interference fit using nominal dimensions. Therefore to make the mating part fit, the surface must be offset shrunk or scaled down. The resulting minimum offset needed to clear the biggest bump or step found upon a surface will typically create a gap in other areas that far exceed the minimum allowable gap.

Other solutions include software packages that simply smooth data for the making of replica parts or the inspecting of fabricated parts. The disclosed embodiments are directed to a mating part and not a replica. Walls of the base part may have many small bumps and step edges (tape lines). A typical software package creates mating parts that only includes points of interference and/or too much gap between the base part and the mating part.

BRIEF DESCRIPTION

In one aspect, a computer-based method for defining a surface of a part for placement adjacent a mating surface of a base part is provided. The method includes receiving raw data which defines the mating surface of the base part, smoothing the raw data, generating a stable reference frame consisting of at least one of a substantially smooth curve and surface based on the smoothed raw data, calculating a dimensional offset curve or surface using the smoothed raw data and the stable reference frame curve or surface by referencing any peaks in the smoothed raw data within a predefined range of a corresponding point in the stable reference frame curve or surface, smoothing the dimensional offset curve or surface, and outputting the dimensional offset curve or surface for utilization in fabricating the part that is to be mated with or adjacent a mating base part.

In another aspect, a system for defining a surface of a part for placement adjacent a mating surface of a base part is provided. The surface definition is utilized in fabrication of the part. The system includes a database configured to receive and store raw data relating to the surface of the base part and a computer configured to be coupled to the database. The computer is configured to receive raw data which defines the mating surface of the base part and cause the raw data to be stored in the database, smooth the raw data, generate a stable reference frame consisting of at least one of a substantially smooth curve and surface based on the smoothed raw data, calculate a dimensional offset curve or surface using the smoothed raw data and the stable reference frame curve by referencing any peaks in the smoothed raw data within a dynamic or fixed (predefined) range of a corresponding point in the stable reference frame curve or surface, smooth the dimensional offset curve or surface, and store the smoothed dimensional offset curve or surface in the database for utilization in part fabrication.

In still another aspect, a computer-based method for manufacturing a part, the part configured for eventual placement against a mating surface of a base part, is provided. The method includes performing measurements with a laser displacement device to define the mating surface of the base part, smoothing the data associated with the measurements, generating a stable reference frame based on the smoothed measurement data, calculating a dimensional offset based on the smoothed measurement data and the stable reference frame curve by referencing any peaks in the smoothed measurement data within a predefined or dynamic range of a corresponding point in the stable reference frame, smoothing the dimensional offset, and fabricating a part for placement adjacent the mating surface of the base part, a portion of the part defined by the smoothed dimensional offset.

The features, functions, and advantages that have been discussed can be achieved independently in various embodiments of the present invention or may be combined in yet other embodiments further details of which can be seen with reference to the following description and drawings.

DETAILED DESCRIPTION

The described embodiments are related to the processing of surface profile data using a method that considers surface roughness and abnormalities. The generated data points are then transformed in such a way that the result of the transform is a representation of a mating part surface with minimal and non-interfering gaps therein. The embodiments include the processing of surface definition data (in two or three dimensions) and the transforming of the data points into a representation of a mating part surface that that fits properly against the base part surface having the profile. Proper fit is achieved even with surface abnormalities. In various embodiments, a surface of the mating part is conditioned in such a way that a practical size mill tool can machine the mating surface.

In various embodiments, laser scanned dimensional profile data, or data generated through other means such as a CMM with a contact probe, is utilized, along with an algorithm defined method to determine a minimum dimensional offset gap from a surface. The surface definition data (the profile data) is not abnormal but rather is a representation of the arbitrary shape imposed by the natural outcome of the manufacturing process. This is sometimes referred to as the "as built" condition.

Such a dimensional offset gap allows a mating part that is machined only once to fit, spanning bumps, valleys, and "pockets" present on the base part. In one embodiment, the methods are applicable as a part of the normal composite part cure process. The surface definition data (the profile data) is not abnormal, per se, but rather is a representation of the arbitrary shape imposed by the natural outcome of the manufacturing process (i.e., the "as built" condition).

Figure 1:
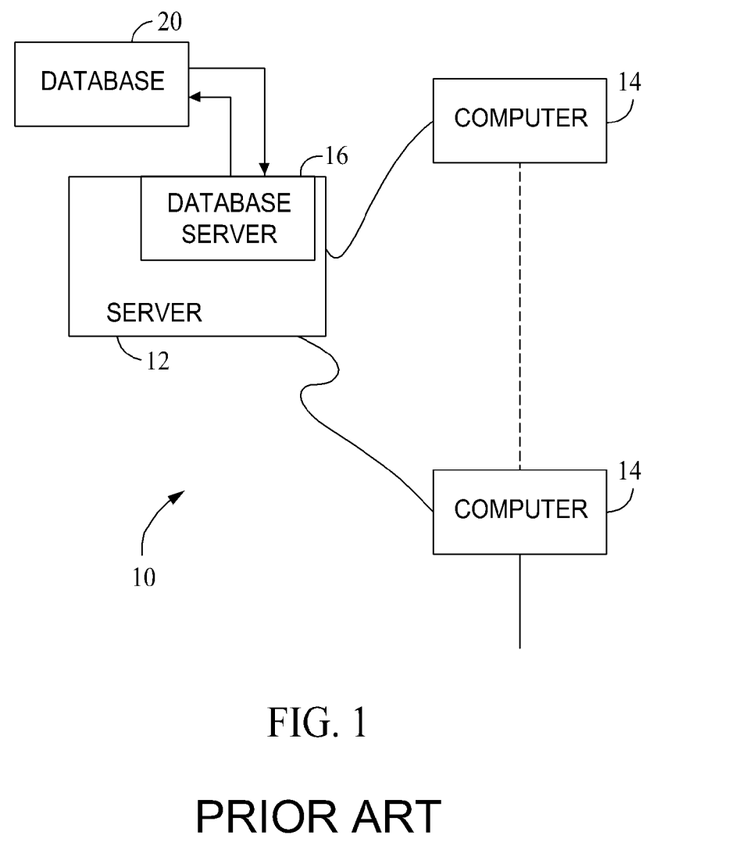
FIG. 1 is a simplified block diagram of an exemplary embodiment of a system architecture.

FIG. 1 is a simplified block diagram of an exemplary system 10, which is one example of a system that could run the above mentioned, and below described algorithms. More specifically, in the example embodiment, system 10 includes a server system 12, and a plurality of client sub-systems, also referred to as client systems 14, connected to server system 12. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to database 20 which may contain, for example, a variety of information on surface definitions, as described below in greater detail.

In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

As further explained herein, an operational sequence performed utilizing system 10 first involves removal of redundant and isolated points of surface definition data, followed by smoothing and manipulation of the part surface data in such a way as to allow clearance for the protruding features to bridge small pockets on the surface. This process results in mating parts that physically fit the adjacent base part. The process involves the input of calibrated raw data, pre-smoothing of the raw data, the creation of a substantially smooth data curve backbone, using the pre-smoothed data, as a stable reference frame, creation of dimensional offsets from the peaks of the pre-smoothed dimensional data, and performing a final smoothing operation. At completion of the process the data is available for export for use in generation of machine control code for production of the mating part.

Figure 2:
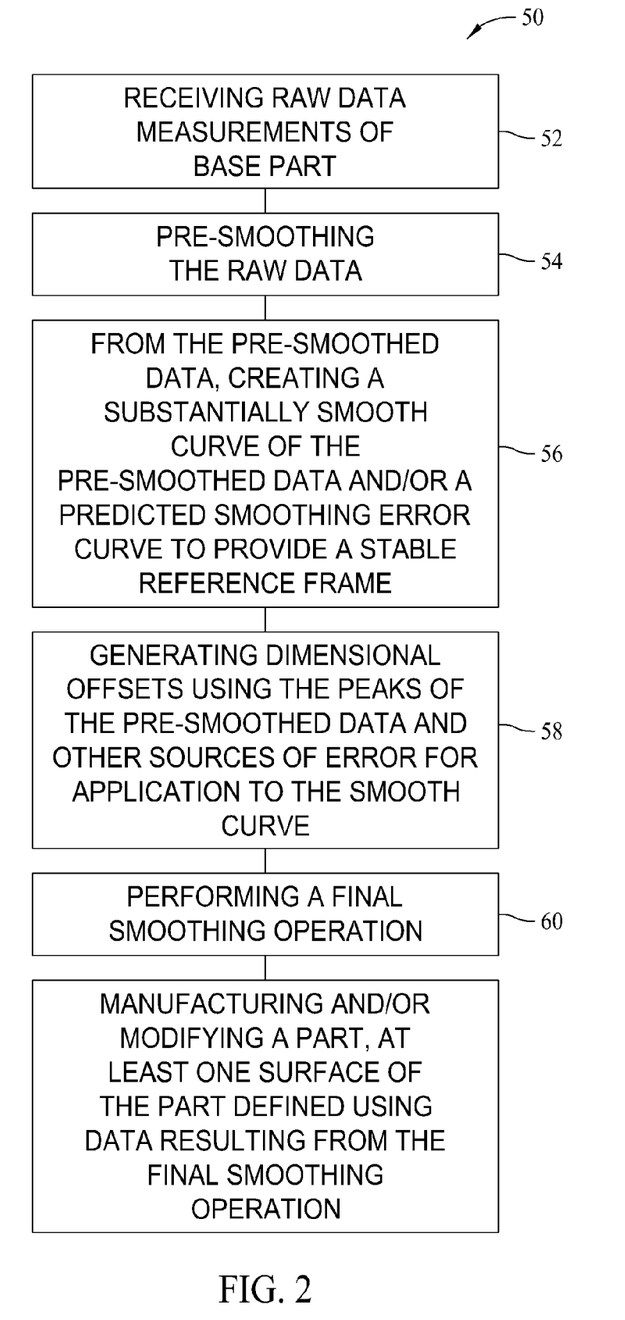
FIG. 2 is a flowchart illustrating a method for processing raw data relating to a surface into smoothed data useful for fabricating a part that mates with the surface.

FIG. 2 is a flowchart 50 that illustrates a process for manipulating and/or filtering measured and generated curve fitted data. The data relates to a surface by offsetting the data in such a way as to create an optimum surface path or machined contour which produces a uniform gap space within a specified tolerance range. This offset data is utilized in the manufacture of a fabricated part that has a surface best fits the bumps, valleys, and pockets of the surface to which it is to be mated. Referring specifically to flowchart 50, raw data related to the base part surface is received 52, or input, the raw data is pre-smoothed 54 which allows the creation 56 of a substantially smooth data curve and/or a predicted smoothing error curve as a stable reference frame. This smooth data curve is sometimes referred to as a data curve backbone (or a surface backbone when working in three dimensions). Dimensional offsets from peaks of the pre-smoothed dimensional data and other sources of error are generated 58, and a final smoothing operation is performed. In one embodiment, the raw data includes calibrated raw data laser scanned dimensional surface roughness and abnormality profile data which is then used to determine the minimum uniform dimensional offset gap from a surface which would allow a mating part to fit flush.

The disclosed process clears the most significant bumps and step irregularities associated with cured composite mating part surfaces. In one embodiment, the data generated in the final smoothing operation is available for export to other software packages for motion control code development permitting a numerical controlled milling machine to mill the developed profile, or surface, on the part. In alternative embodiments, the described processes are programmed into a software package operable on a system, for example system 10, or other prototype application operable on such systems, or other forming device such as a laser sinter manufacturing device.

In various embodiments, further described herein, an automatic hole-find routine is utilized to accurately find the center point and diameter of a hole within a base part. The center point is calculated from data taken from inside the hole. In the embodiment, the center point is placed on a best fit mathematical plane extracted from surface data surrounding the entrance of the hole. An automatic hole patch routine is then utilized to patch the surface data that has been perturbed by the surface defect the hole creates in a predefined region located by the calculated hole center and plane.

A surface data manipulation routine is then utilized to offset the surface data (shrinks the part) in such a way as to create an optimum smooth surface that best suits the mating of a custom formed part that fits an enclosed (or non enclosed) surface with minimal gap. This process allows an assembly of parts to achieving design positional accuracy, due to proper accounting of surface and manufacturing issues. Such issues include a fixed or variable offset (shrinkage) that is applied dependent on the local tolerance of the overall manufacturing tolerance, and an offset routine that effectively reacts to the roughness (bump height) of the surface by offsetting the surface from the peaks of the bumps rather than from the average surface profile. The effective result of the offset routine is that larger bumps get higher offsets than smaller ones.

Overall, the described process effectively bridges small pockets on a bumpy surface of a base part making it possible to manufacture and assemble a custom mating part. Specifically, the offset routine reacts to sudden upsets or steps in a surface profile. This mathematical procedure ensures proper clearance of the step or bump. A normal smoothing function blends the detail of the surface in a way that causes interference between the two mating parts at a step or bump in the surface.

As is further described herein, the data generated by the laser scanner or other device must be processed and transformed into a set of points that represent a mating part surface that fits properly against the enclosed surface or surface. The flowchart 50 can be described in three basic steps. First, the center of the four pilot holes is found using calibrated hole scan data, patching and repair of the raw surface data is applied, and the data is manipulated into points that represent a machineable surface that will fit properly against the mating part. Alternatively, instead of the four pilot holes, the reference features could include edges, offsets or hole centers. During repair of the raw data there is an operation that patches the drilled holes that have been measured in the surface. In addition, there are several operations that involve the offset of the measured surface in such a way as to allow clearance of protruding features yet bridge the small pockets on the surface. In one embodiment, calibrated laser scan data used is received from a robotic CMM that has one rotational and two linear encoder values. In addition there is a range value from a laser displacement sensor.

Hole Finding Routines and Patches

There are several types of patches that become essential to the creation of useful machineable surfaces. In a hole patch, the surface data generated near the edge and inside the hole is repaired so that it is of value in generating a machineable surface. Left unrepaired, the disruption will propagate a serious surfacing flaw over a broad area during the smoothing, meshing, surfacing, and machining process. The hole patch routine essentially manufactures artificial points that bridge across the disrupted area generated by the hole. This routine allows the program to know the precise location and diameter of the hole and a definition of the plane generated from points surrounding the hole entrance. The data points located in the known flawed area can be projected onto the hole plane to accomplish this repair. Alternatively, bridging the hole could be accomplished by using a trending function and by referencing surface data values on either side of the hole.

An edge swath patch is used on machineable surfaces that extend up to an edge of a part. Just like with holes, surface data is unstable near the edge of any surface. In order to accomplish smoothing, meshing, surfacing, and machining the surface is extrapolated, or patched, in a swath surrounding the surface bounded by an edge. This swath of extrapolated surface data begins just inside the edge where disturbance begins.

Extrapolation can be accomplished by trended values extracted from surface data a certain number of points or distance inside the known boundary of disturbance. An increase in stability of the extrapolated data can be achieved by scanning, collecting and/or organizing data from multiple directions. In this alternate scheme, the part can be scanned in the longitudinal and latitudinal direction (or some combination). The extrapolated data is essentially woven together from two directions offset from the edge.

In some cases, like the scan of a rectangular shaped cavity, each face should be decoupled to improve part machineability. In a virtual patch the data can be separated at each of the four corners. At this point it becomes desirable to extrapolate the surface near the corner in order to facilitate a simplistic machineable surface that does not include a sharp corner. The four surfaces are much easier to machine separately than as one complete surface.

Figure 3:
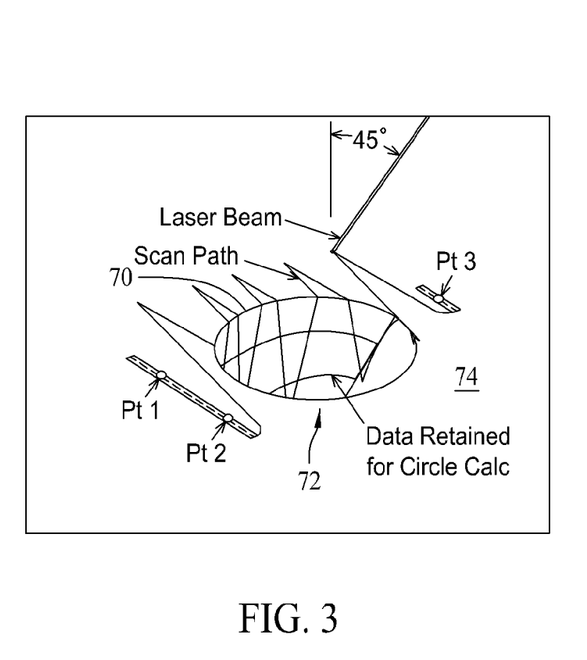
FIG. 3 illustrates a scanning path for a scanning device across an area of a base part that includes a pilot hole formed therein providing raw data for determining a center of the hole.
Figure 4:
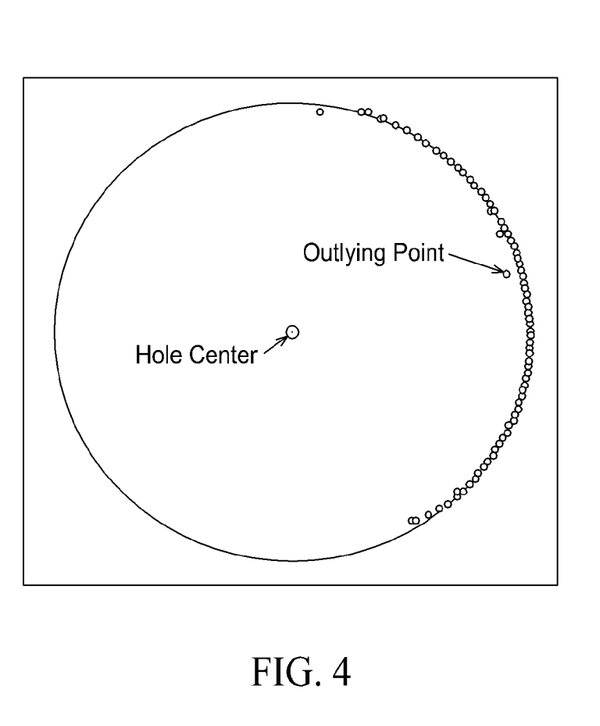
FIG. 4 is an illustration of a best fit circle of data associated with the data generated by the scanning device, also showing the hole center.

Now referring to FIGS. 3 and 4, the hole finding routine is a process of calculating a best fit circle of data (shown in FIG. 4) from one side of the wall 70 of hole 72. The data taken by the scanner is orientated approximately 45 degrees from the axis of the hole 72 though the data can be measured, for example, from about 20 degrees to about 70 degrees from the axis of the hole. The resulting data is a measurement of the surface 74 surrounding the hole 72 as well as the data from the back side of the wall 70 of the hole 72. The calibrated data is cleaned using processes described elsewhere herein. The data from the hole wall 70 is projected onto the plane that is coincidental with the surface of the hole entrance. The plane and the circle center are passed to the surface processor so the hole can be patched.

Laser displacement sensors reflect accurately from surfaces but become significantly unstable at edges of surfaces. To generate highly accurate results it is best to use data from stable readings. This process ignores data near the entrance of the hole 72. The quality in the measurements comes from analyzing data points from about 0.8 mm to about 1.5 mm deep in the hole 52, in a specific implementation. The data points could be much deeper or shallower depending on the stability of the readings. For example, a laser displacement sensor with a small dot size could be significantly shallow in the hole when stability occurs.

Ultimately, the (x, y, z) locations of multiple pilot holes is used for aligning the measured surface with the substrate mating part to be machined. In alternative embodiments, other features such as edges and faces can be used for part alignment. In one embodiment, the multiple (e.g., four) holes are drilled into the mating part to aid in proper placement of the part in the assembly. There are several major steps to the hole finding routine, including, filtering and calibrating the scanned surface data, establishing a plane from the data surrounding the entrance of the hole, discarding all points except those inside the hole 72, projecting the remaining points onto the plane, finding a best fit circle though the points, discarding outlying points, find a best fit circle from the remaining points, and outputting the hole center, hole diameter and the a, b, c, and d values for the plane. In addition, further iterations refine the quality of hole find data. For example, the initial hole center can be used to find a narrow ring or band of surface data surrounding the hole entrance. This ring of surface data can generate a more accurate plane on which to project hole data.

While described in terms of using multiple pilot holes, various other holes and features may be used to align the measured surface, for example, a best fit of more than three holes, three holes, two holes and an edge, one hole and two edges, and three planes that are significantly non parallel, to name a few.

Mathematical Steps For finding The Hole Center:

Three points, X0, X1, X2 are used to create a plane. The three points are generated from a best fit of surface data surrounding the hole 72. The surface data used for this step are the points collected at the beginning of the hole scanning process and at the end of the scanning process thereby ensuring that data used to calculate a plane is not extracted from data describing the inside of the hole. Later, after the center has been found, the process can return to extract more accurate plane data.

A matrix of the three points is written as $$M = \begin{pmatrix} x_0 & y_0 & z_0 \\ x_1 & y_1 & z_1 \\ x_2 & y_2 & z_2 \end{pmatrix}.$$

The determinate of the matrix is D=det(M), and the definition of a plane is ax+by+cz+d=0, where d≠0.

By arbitrarily setting d to 100, $$a = \frac{-d}{D}\det\begin{pmatrix} 1 & y_0 & z_0 \\ 1 & y_1 & z_1 \\ 1 & y_2 & z_2 \end{pmatrix}, \quad b = \frac{-d}{D}\det\begin{pmatrix} x_0 & 1 & z_0 \\ x_1 & 1 & z_1 \\ x_2 & 1 & z_2 \end{pmatrix},$$

$$\text{and} \quad c = \frac{-d}{D}\det\begin{pmatrix} x_0 & y_0 & 1 \\ x_1 & y_1 & 1 \\ x_2 & y_2 & 1 \end{pmatrix}.$$

x, y and z are variables that by iteration are found to balance the equation for the definition of the plane.

Distance to the Plane:

Each point is evaluated to see if is in the range from the plane that is to be kept. The distance (s) of each (x, y, z) point from the plane is calculated $$\text{as} \quad S = \left| \frac{ax + by + cz + d}{\sqrt{a^2 + b^2 + c^2}} \right|.$$

All points are kept that are in the range from 0.8 to 1.5 mm from the plane which results in useful points from the wall of the hole 72 and a definition of a plane a, b, c, and d. It is desirable to extract useful points that are in the hole deep enough to achieve stable readings. In addition, it is not desirable to use data from deep in the hole unless one is trying to extract the hole vector (which is useful when the hole is substantially not normal to the plane describing the entrance to the hole.) In regard to the embodiment described herein, it has been found through experimentation (on small holes between 2.5 and 8 mm in diameter) that data that is 0.8 to 1.5 mm in depth is most useful to the hole finding process.

Project the Points onto the Plane:

The points are projected onto the plane so that they can be analyzed in two dimensions. The new x y z points on the plane are:

$$x_{new} = x + a\sqrt{\frac{s^2}{a^2 + b^2 + c^2}}, \quad y_{new} = y + b\sqrt{\frac{s^2}{a^2 + b^2 + c^2}},$$

$$\text{and} \quad z_{new} = z + b\sqrt{\frac{s^2}{a^2 + b^2 + c^2}}.$$

The above equations and the transforms that follow are useful for projecting data onto a XZ plane. Data that resides on a plane that is near the YZ or XY plane utilize a similar transform method to achieve reasonable accuracy. In general, the hole data should be transformed to the closest plane (XY, YZ, or XZ).

Transform the Points to the XZ Plane:

The points are then transformed to the XZ plane so that simple two dimensional calculations can be performed. The transformation matrix for this operation is as follows (unless the plane is near or equal to the XY, or YZ plane): $D=\sqrt{a^2+b^2}$, and $E=\sqrt{a^2+b^2+c^2}$.

The transform to the XZ plane is written as:

$$\begin{pmatrix} \frac{-b}{D} & \frac{a}{D} & 0 \\ \frac{a}{E} & \frac{b}{E} & \frac{c}{E} \\ \frac{-ac}{DE} & \frac{-bc}{DE} & \frac{D}{E} \end{pmatrix}.$$

The new X is the matrix multiplication of the row: (x, y, z) values times the first column of the transformation matrix. In Microsoft Excel, the command is called MMULT. Y and Z are calculated using the subsequent columns. Excel is a registered trademark of the Microsoft Corporation, Redmond, Wash.

Find the Center of the Circle:

The average (x, z) position of the hole points is taken and used as the first guess for the center of the circle. This average position will always be inside the circle, making the next step of solving for the best fit circle center a stable process that converges on a solution inside the true circle.

When the following equation is solved for its minimum sum while manipulating the (x, z) center point and the diameter will yield the best (x, z) location for the circle $x_c$=best fit position x, $z_c$=best fit position z, and the best diameter:

$$\min = \sum_1^n \left| \sqrt{(x - x_c)^2 + (z - z_c)^2} - \frac{\text{dia}}{2} \right|.$$

Discard Outlying Points for the Circle:

Next, any outlying points from the hole data are discarded. In one embodiment, a filter is used that looks at points outside a narrow bandwidth of the best fit circle. The circle center find routine is performed again, providing results that are more accurate. In an alternative embodiment, a best fit plane is determined from data around the entrance to the hole. Repeating the proceeding steps result in the generation of a more accurate value for the true center.

Transform the Center Points Back to the Original Plane:

The x, y, z center point is then rotated using the following transformation matrix: $D=\sqrt{a^2+b^2}$, and $E=\sqrt{a^2+b^2+c^2}$.

Transform to original plane from XZ plane to original plane according to $$\begin{pmatrix} \frac{-b}{D} & \frac{a}{E} & \frac{-ac}{DE} \\ \frac{a}{D} & \frac{b}{E} & \frac{-bc}{DE} \\ 0 & \frac{c}{E} & \frac{D}{E} \end{pmatrix}.$$

The new x is the matrix multiplication of the row: (x, y, z) values times the first column of the transformation matrix. The Microsoft Excel command MMULT is again utilized in one embodiment. Y and Z are calculated using the subsequent columns.

The hole center, the hole diameter and the a, b, c, d values that define the plane of the hole entrance are then output. The hole center is used for alignment of the surface to the machined part and for drilling the pilot holes in the machined part. Additionally the hole locations are used in conjunction with the plane and the hole diameter to patch the hole in the surface data.

The hole diameter serves as a quality assurance indicator for hole location accuracy. For example, if all the pilot holes are drilled to a known hole diameter of 0.1875", the hole is known to be drilled normal to the surface immediately surrounding the hole, and the found diameter is 0.1865" than the center of the hole may be off by as much as 0.0005".

Hole Patch Routine:

The hole patch routine projects all points that fall within a circle or other geometric figure around each hole point onto the plane of the hole entrance. In one embodiment, the hole patch radius of the hole is 2.54 millimeters.

Example values for hole locations (x, y, z) and the hole plane matrix: (a, b, c, d) are shown in the following table where d is an arbitrary value that must be non-zero.

| x | y | z | a | b | c | d |
|---|---|---|---|---|---|---|
| −119.999 | −251.716 | 50.36456 | 0.00467 | 0.394853 | −0.00096 | 100 |
| −126.199 | 252.7231 | 154.1625 | 0.025366 | −0.36537 | −0.02882 | 100 |
| 135.9438 | 255.3923 | 322.2731 | 0.015822 | −0.3657 | −0.02716 | 100 |
| 142.8147 | −248.193 | 214.2457 | −0.0189 | 0.395831 | 0.004395 | 100 |

Each hole point converts to cylindrical coordinates:

$$r = \sqrt{x^2 + y^2}, \theta_{hole} = a\cos\left(\frac{x}{r}\right) \text{ if } y > 0,$$

$$\theta_{hole} = a\cos\left(\frac{-x}{r}\right) + \pi \text{ if } y < 0, \text{ and } z = z.$$

The radius of the hole converts into a cylindrical patch angle which is defined as $$d\theta_{hole} = a\tan\left(\frac{R_{hole}}{r}\right).$$

In one embodiment, a logical test is performed to see if each point should be manipulated: If the point is within theta or z distance of the hole then a logical step is applied, for example, and a similar operation is performed in the z direction, and this process is repeated for each hole.

If the data point passes a logical test then this projection is applied to the data point, specifically, $$R_{hole-patch} = \left(\frac{-cZ_{step2} - d}{a*\cos(\theta_{step3}) + (b*\sin(\theta_{step3}))}\right).$$

Output Variables ($Z_{step2}$, $R_{step3}$, $\theta_{step3}$) are cylindrical coordinates $Z_{step2} = Z_{step2}$. $R_{step3}$ is chosen based on a logical step in hole patch routine $R_{hole-patch}$ or default $R_{step2}$.

$$\theta_{step3} = a\cos\left(\frac{X_{step2}}{R_{step3}}\right), \text{ if } Y_{step} > 0, \text{ and}$$

$$\theta_{step3} = a\cos\left(\frac{-X_{step2}}{R_{step3}}\right) + \pi, \text{ if } Y_{step2} < 0.$$

Filtering includes removing redundant and isolated points. The input variables are ($Z_{step2}$, $R_{step3}$, $\theta_{step3}$), and $d\theta_{min} = 0.0004$ radians, while $dr_{max} = 0.5$ mm.

The data set of an entire slice is sorted by theta. Starting with the first point, all points are thrown away until a condition $d\theta_{min}$ is met. Alternatively, a distance formula between two points is utilized to calculate which points to keep and which ones to discard.

Each point is compared to the backbone of five points. If the point exceeds $dr_{max}$, then the point is discarded. These steps remove both wild points generated by abnormalities during the reading of sensor values and excess points generated by the excessive data collection. Finally, the first 300 points, or however many points it takes to adequately overlap the data, are taken and they are added to the end of the data set, allowing smoothing functions to discard the beginning and end without losing the complete slice of data. The output is (Z, R, θ). This extension of data is used on enclosed surfaces where each data slice is a complete ring or can be treated as such.

Smoothing and Offset of Surface

Parts that fit within enclosed surfaces must be smaller in order to fit. The shrinkage process is based on a constant and/or variable offset from the measured surface. There are many methods to accomplish this shrinking process, and one of the most stable methods is a multistep process that includes, as described above, inputting calibrated raw data, pre-smoothing the raw data, creating a substantially smooth backbone as a stable reference frame, generating offset from the peaks of the pre-smoothed data, and performing a final smoothing operation.

Figure 5:
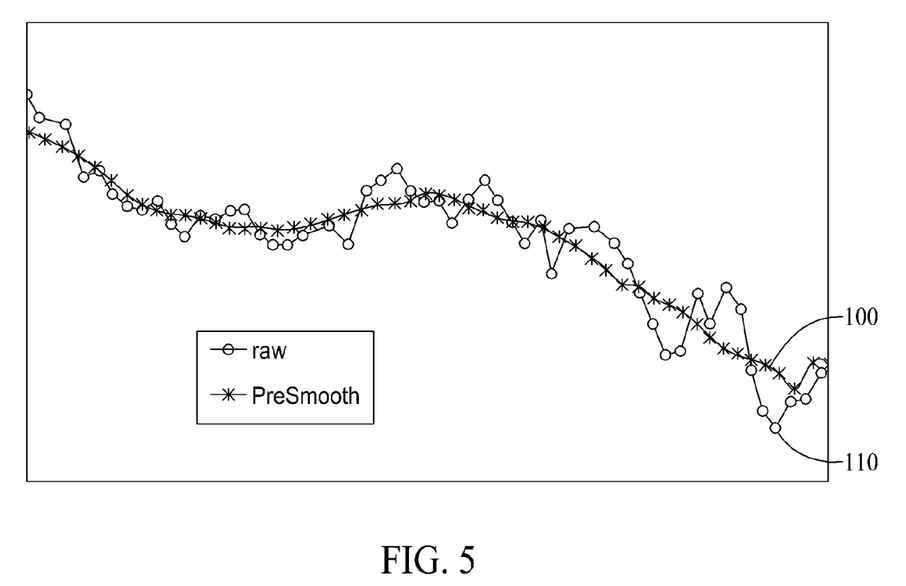
FIG. 5 depicts slightly smoothed raw data and the corresponding raw data points associated with the scan illustrated in FIG. 3.

FIG. 5 is a depiction of pre-smoothing raw data. As can be seen in FIG. 5, a pre-smoothed profile 100 has been created that closely resembles the actual profile 110 of the surface. The calibrated raw data points within actual profile 110 contain a substantial amount of noise which must be filtered and smoothed.

More specifically, and as further described below, FIG. 5 is an example of a nine point smoothing of the raw data profile 110. In this particular example, the pre-smoothing resulted in a $R_y$ (peak to peak) of about 0.004" and a wavelength (La) of about 0.196 inches.

The first step in the pre-smoothing process, which utilizes the inputs (Z, R, θ), is to convert to Cartesian coordinates, namely X=R cos(θ) and Y=R sin(θ). The symmetric average of nine points about x are taken and repeated for y, thereby spacing the points more equally apart. A new X and a new Y is predicted by fitting a straight line through the nine points at each position and solving for the minimum value. The X and Y is used for the knowns, and the Average X and Y as the new position. In equation form, NewX=TREND(X, Y, average Y) and NewY=TREND(Y, X, average X).

The proper n factor, where n is 5, 7, or 9 points, filters out much of the noise in the data and yields a profile that closely matches the Peak-to-Peak values of the real surface profile.

Y=a+bX is the definition of a straight line and $$\Pi = \sum_{i=1}^{n} [Y_i(a+bX_i)]^2 = \min$$

is a least square method. A conversion back to cylindrical coordinates is made according to $$R = \sqrt{X^2+Y^2}, \theta = a\cos\left(\frac{X}{R}\right) \text{ if } Y > 0, \text{ and } \theta = a\cos\left(\frac{-X}{R}\right) + \pi \text{ if } Y < 0.$$

Figure 6:
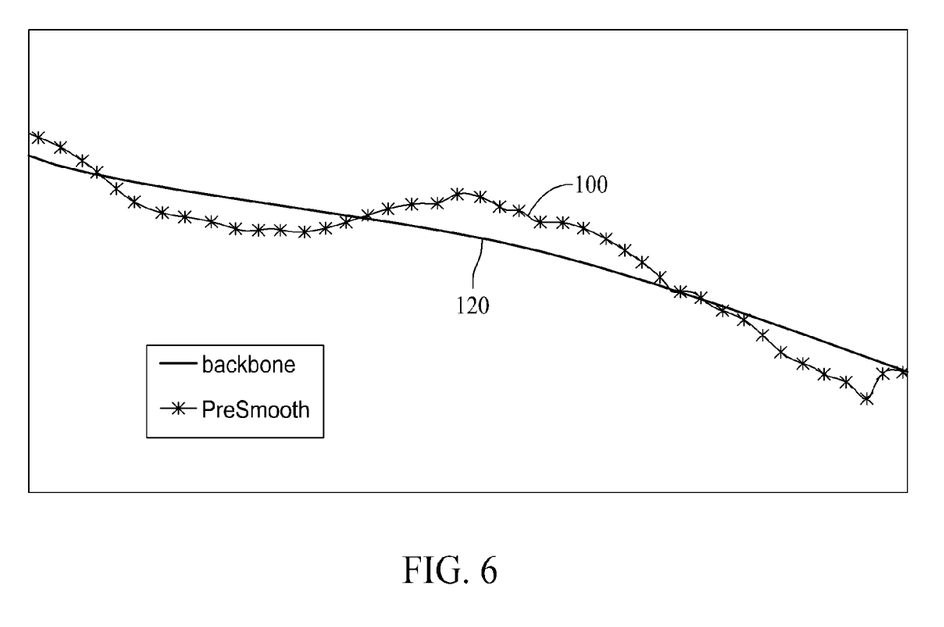
FIG. 6 illustrates a stable reference frame, or backbone, generated using the slightly smoothed raw scan data, the slightly smoothed raw scan data also shown in FIG. 5.

The backbone/predictive smooth curve or surface is then created as shown in FIG. 6. First, a 31 point backbone 150, or other number based on the desired smoothing effect, is created using the steps for pre-smoothing the raw data as outlined above. In one application, this back bone is about 3 mm to about 6 mm in length. A new X and a new Y are predicted by fitting a straight line through 31 points in the same manner as the pre-smooth curve. The Average X and Y over 31 points is utilized as the new position, which ensures near even spacing, again, NewX=TREND(X, Y, averageY) and NewY=TREND(Y, X, averageX).

Figure 7:
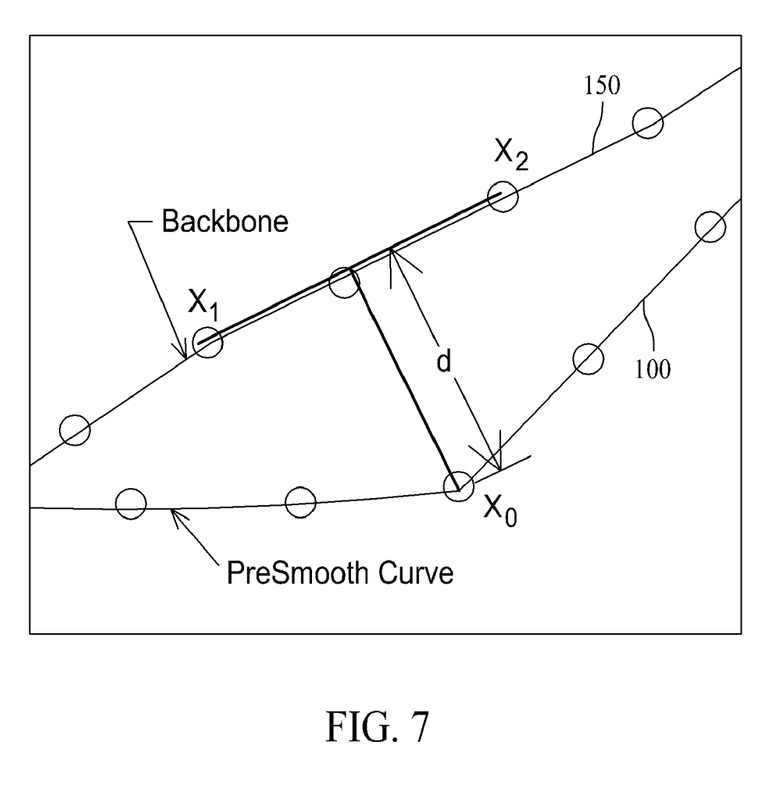
FIG. 7 illustrates determination of an offset from the stable reference frame to the pre-smoothed raw scan data.

The backbone/predictive curve 150, or stable reference frame, is a stable way to calculate magnitudes of variation and vectors for offsets. To determine the offsets from the peaks of bumps, as shown in FIG. 7, the distance of each point to the backbone curve 150 must be calculated.

The pre-smoothed curve 100 is compared against the backbone curve 150 by finding the distance between a point defined by: $x_0=(x_0,y_0)$ and a line defined by two points: $x_1=(x_1, y_1)$ and $x_2=(x_2, y_2)$. These two points are an approximation of the backbone curve using a point on either side of the equivalent point on the backbone curve.

The offset, d, is written as $$d = \frac{|(x_2-x_1)(y_1-y_0) - (x_1-x_0)(y_2-y_1)|}{\sqrt{(x_2-x_1)^2 + (y_2-y_1)^2}}.$$

The offset should be measured from the peaks of the bumps rather than the average surface profile. The peaks of the bumps are the controlling features when it comes to part mating. Small valleys and holes in the internal surface must be spanned by the mating surface. It is impossible to install parts when small bumps and ridges are placed on the mating surface. Furthermore, the manufacturing of small protruding bumps is impractical.

The local maximum peak height is calculated as $d_{max}$=MAX($d_{i-n/2}, \ldots, d_{i+n/2}$) n{12, 14, ... 22}. Initial offset, or shrinkage, conditions depend on the tolerance of the entire process which includes the scanner, surfacing, CAM programming, machining, and thermal growth to name a few The errors in the entire process can be absorbed by the minimum offset shrinkage.

Offset=F=$d_{max}$+0.003 in+f(d), where f(d) is a variable function explained below.

Figure 8:
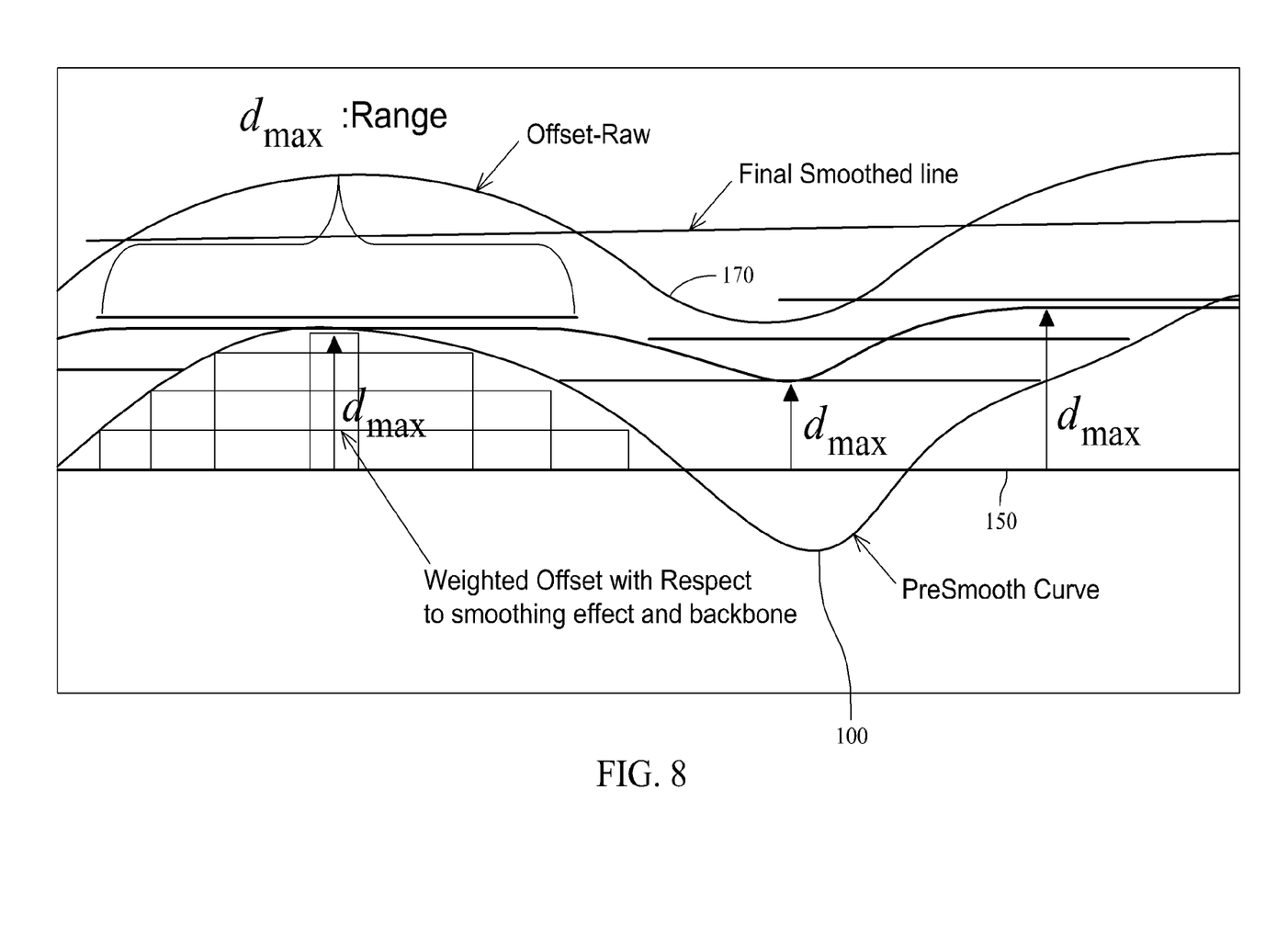
FIG. 8 illustrates an offset that is applied to the stable reference frame to address any peaks that exist within the pre-smoothed raw data within a predetermined range of each point.
Figure 9:
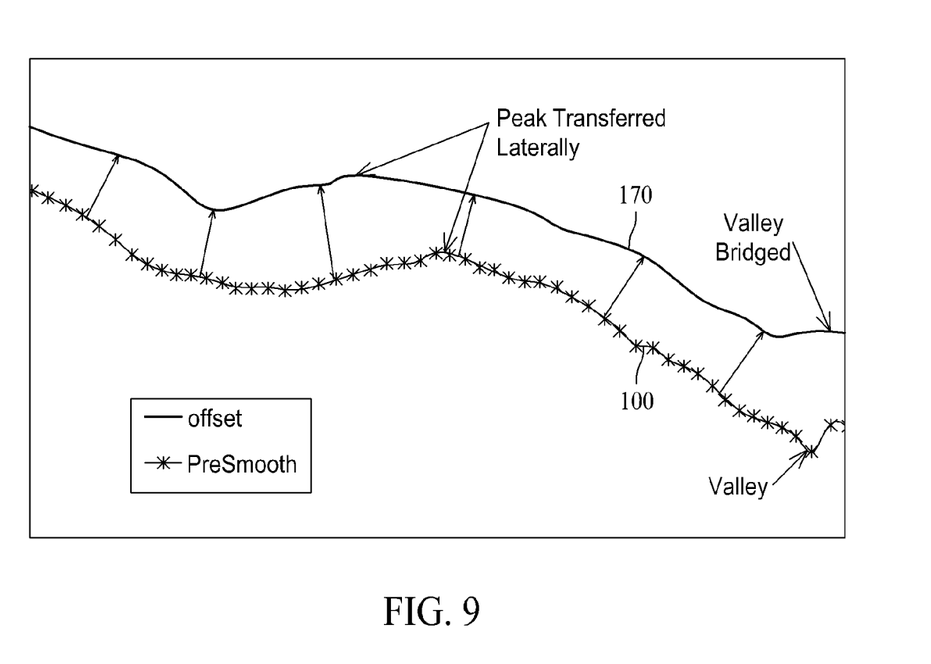
FIG. 9 illustrates an offset curve generated using peaks and valleys in the pre-smoothed raw scan data that reside within 10 points of each point.

To accomplish the spanning of valleys and holes such as those shown in FIG. 8, the offset curve 170 must reference any peak that exists within a certain range of each point. FIG. 9 illustrates an offset made from peaks of bumps that reside within 10 points (0.060") of each point. This offsetting function has the effect of bridging valleys in the surface. The backbone is used solely as a reference frame for calculating magnitude of peaks and projection angles.

Variable Offsets

There are times in a smoothing process where a constant offset is not adequate to clear all the bumps. This is partly due to the smoothing function itself which tends to wash the detail from the profile. Additionally, the machine tool that cuts the surface of the part may not be able to perfectly follow the detail of a surface containing a sudden upset.

To undo some of the washing of detail a variable offset can be applied as a function of the variation from the backbone or as a step function when variation in a measured surface reaches a certain magnitude. The variable can be accomplished by a variety of functions that are dependent on d, $d_{max}$ or other variables. The most simplistic approach can be illustrated in the following step function: f(d)=0.000 if d is less than or equal to 0.0012 inches and f(d)=0.0015 if d is greater than 0.0012 inches.

Figure 10:
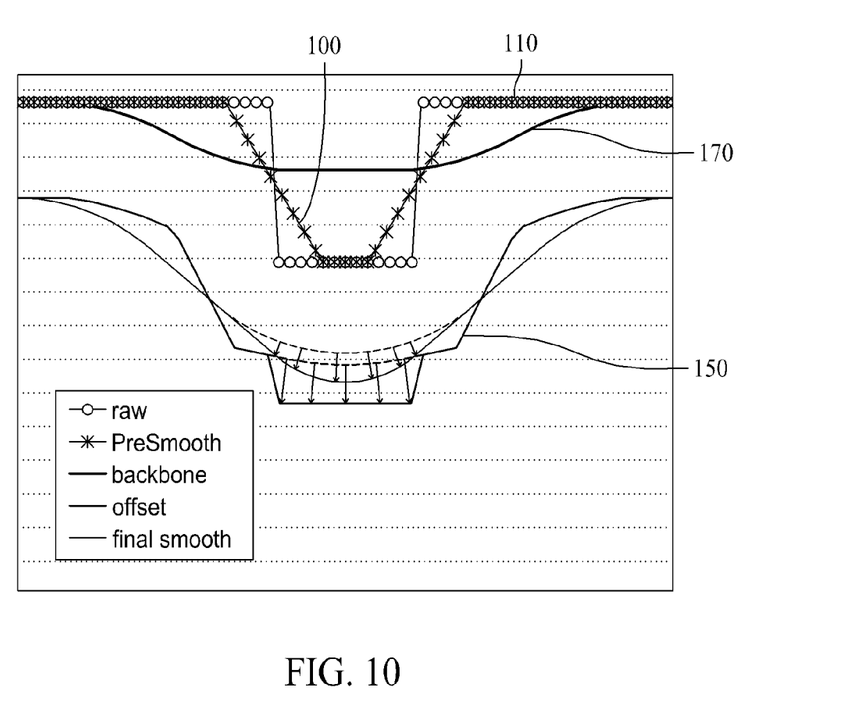
FIG. 10 depicts a section of an offset curve that has had a step function applied to illustrate the principle of applying a bit of extra offset when the variation from the stable reference frame reaches a defined level.

FIG. 10 depicts a section of the offset curve 170 that has had a step function applied to illustrate the principle of applying a bit of extra offset when the variation from the backbone curve 150 reaches a certain level. Referring to FIG. 10, the accentuated offset helps the final smoothed curve clear the bump by a significantly wider margin than without the amplification. With a constant offset the min clearance is 0.002". With a variable amplified offset the min gap is almost 0.003".

Figure 11:
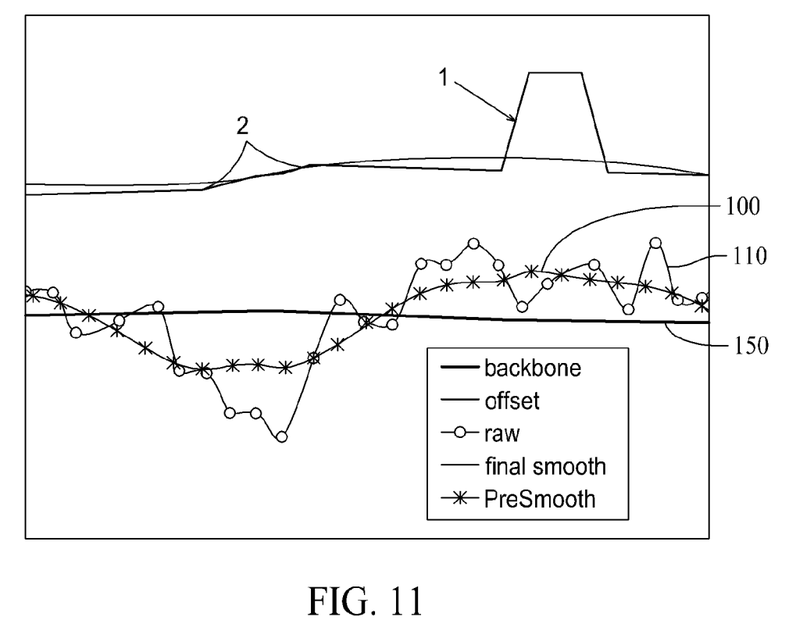
FIG. 11 illustrates a variable offset that has been applied because the pre-smoothed raw scan data exceeded a set threshold of variation from the stable reference frame.

In FIG. 11, a variable offset 170 is applied (1) because the pre-smooth line 100 exceeded a set threshold of variation from the backbone curve 150. The offset is based on the maximum peak value within a certain range from each point. The offset begins to come down from the peak in area (2) providing the function of spanning valleys and holes.

Figure 12:
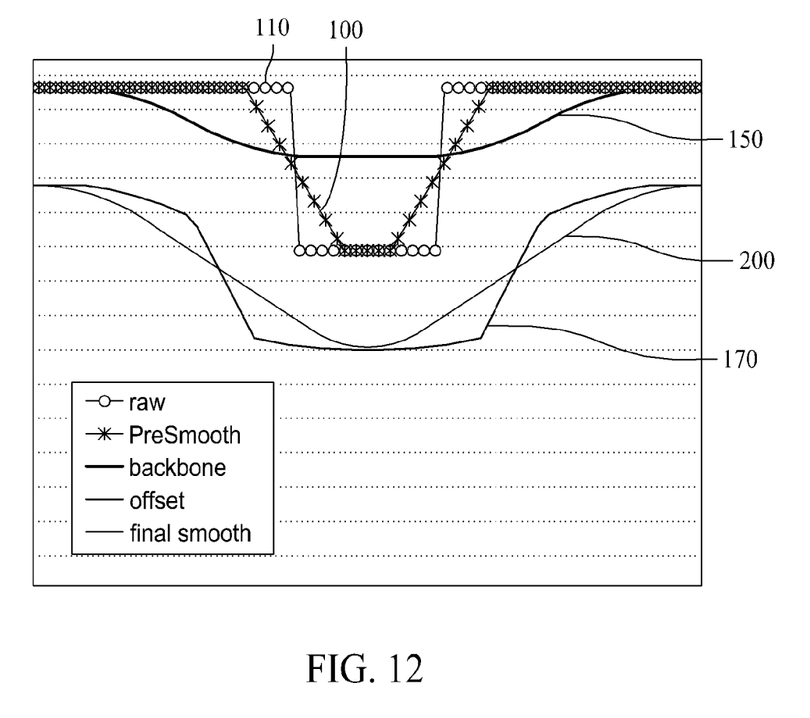
FIG. 12 depicts a section of an offset curve generated utilizing an offset different than that of FIG. 10.

In FIG. 12, a more complex equation could be made to control the reaction. If $d_{max}$ is used as the input variable the effect of amplification will make the reaction zone wider, for example, f(d)=1.3$d_{max}$ if $d_{max}$ is greater than 0.0016 inches.

Calculating the Offset Vector:

Calculate the MOVE vector for the offset of each point by calculating the slope symmetrically over at least n+1=13 points on the backbone curve, specifically $$M_x = \frac{1}{\sqrt{1+\left(\text{SLOPE}\left\{X_{i-\frac{n}{2},\ldots,i+\frac{n}{2}}, Y_{i-\frac{n}{2},\ldots,i+\frac{n}{2}}\right\}\right)^2}},$$

$$\text{IF} \left|\text{SLOPE}\left\{X_{i-\frac{n}{2},\ldots,i+\frac{n}{2}}, Y_{i-\frac{n}{2},\ldots,i+\frac{n}{2}}\right\}\right| \leq \infty$$

$$M_y = \frac{1}{\sqrt{1+\left(\text{SLOPE}\left\{Y_{i-\frac{n}{2},\ldots,i+\frac{n}{2}}, X_{i-\frac{n}{2},\ldots,i+\frac{n}{2}}\right\}\right)^2}}$$

$$\text{IF} \left|\text{SLOPE}\left\{Y_{i-\frac{n}{2},\ldots,i+\frac{n}{2}}, X_{i-\frac{n}{2},\ldots,i+\frac{n}{2}}\right\}\right| \leq \infty$$

where ∞ is approximately equal to 100.

Take the SIGN to find which quadrant the point is in. Move the point over according to each X and Y move vector magnitude M. $X_{shrunk}=(X_{31}-M_xF)$ and $Y_{shrunk}=(Y_{31}-M_yF)$.

Final Smoothing

Figure 13:
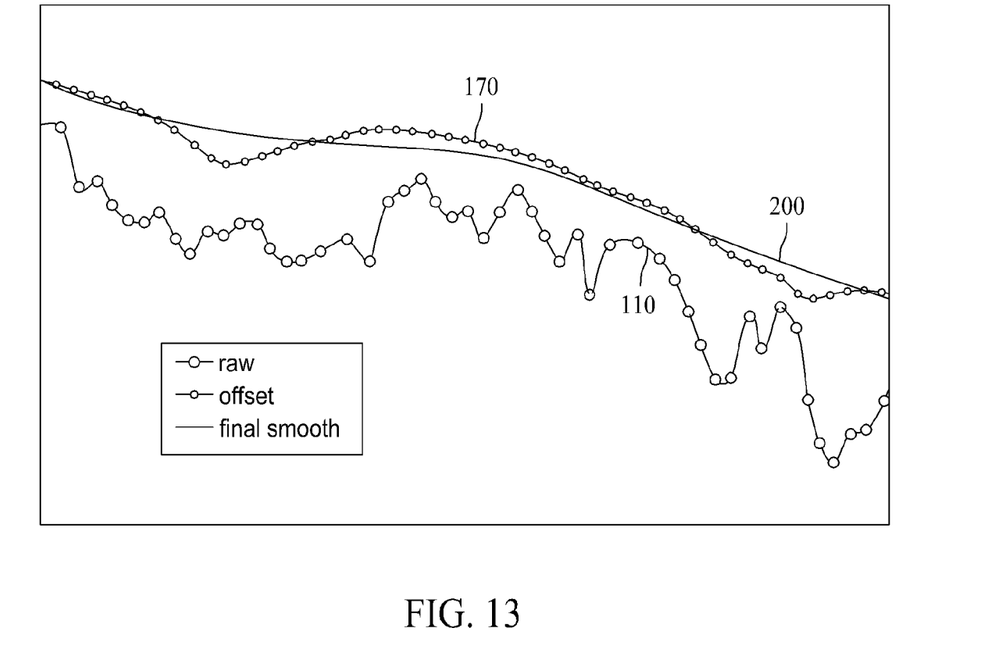
FIG. 13 illustrates an offset curve that has been smoothed using 21 points, yielding a curve that spans the valleys yet clears the peaks of all bumps.

As shown in FIG. 13, the offset curve is smoothed using 21 points (which in one application is approximately 0.125"), yielding a curve that spans the valleys yet clears the peaks of all bumps.

Figure 14:
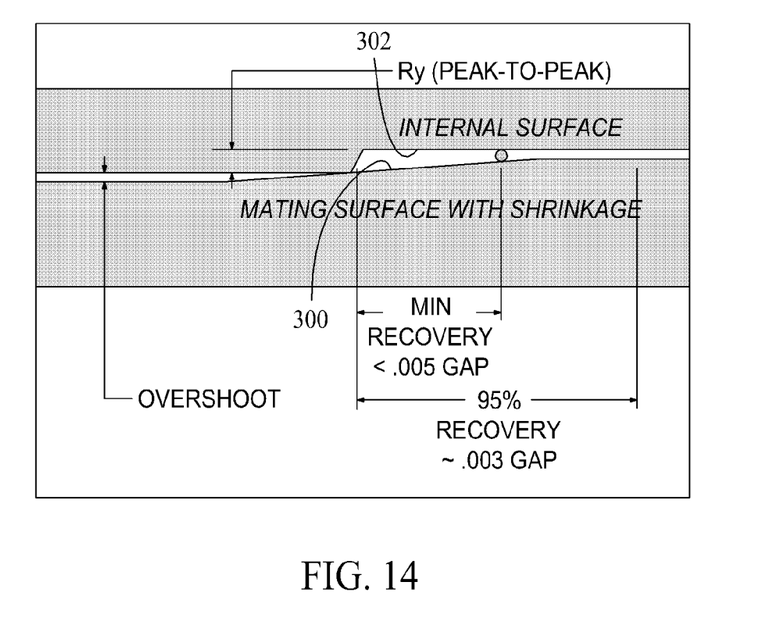
FIG. 14 illustrates final results for one application, where the mating surface has barely cleared the internal surface.

FIG. 14 shows the final results for one application, which has been referred to several times herein. As shown, the mating surface barely clears the internal surface at the edge of the step.

A new X and a new Y is predicted by fitting a straight line through 21 points in the same manner as the pre-smooth curve. The Average X and Y is used over 21 points as the new position, ensuring near even spacing. As before, New X=TREND(X,Y, average Y) and New Y=TREND(Y, X, average X).

In regard to output data, about four out of five points can be discarded by using the distance formula between each point. In the application discussed herein, this means that each point will be about 0.030" apart. The reduced number of points is then exported for creation of a surface that can be machined.

The methods described herein allow the smoothed surface/curve to approximately match the desired offset regardless of the curvature of a surface. The method predicts the error associated with smoothing before calculating the offset from the curve. Accounting for this error in advance yields a near correct final smoothed surface.

An addition to this method is the calculation of the expected error associated with meshing, surfacing, cutter path calculations and machine tool shape error. By anticipating these effects the final smoothed curve/surface takes an additionally manipulated shape so the final machined surface fits with higher accuracy.

Reiterating, the raw data is calibrated and presmoothed. A smooth curve backbone or surface framework is then calculated for reference calculations, and a predicted final smooth curve is calculated. This final smooth curve may be the same curve as the backbone if the same smoothing values are used. Smoothing causes dramatic error to a surface that has curvature. The difference between the predicted final smooth curve and the pre-smoothed curve yields a magnitude of this error. Applying the magnitude to the offset eventually yields a final smooth line that meets the goal of the minimum offset value.

The offset is calculated based on a reasonable amplification of the bumps and the offset distance from the pre-smoothed data and the predictive smooth effect curve. The curve is offset from the pre-smoothed data and re—smoothed. Now the final smoothed curve is offset as desired to clear all bumps.

The above described processes have been utilized to create prototype components based on the surface data related to the adjacent component. In addition, fillers (digitally defined shims) have been constructed to fill gaps between mating parts. The embodiments described herein therefore allow the particular adjacent component to be constructed with a reduced weight, further illustrating the practicality of the described embodiments.

In the aircraft manufacturing context, manufacturers and suppliers are now able to save cost by being able to automatically process scan data and then machine parts that do not require shims between the adjacent parts, saving substantial amount of labor and flow time.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for defining a surface of a part for placement adjacent a mating surface of a base part, said method comprising:
   receiving calibrated raw data which defines the mating surface of the base part;
   smoothing the calibrated raw data;
   generating a stable reference frame consisting of at least one of a substantially smooth curve or surface based on the smoothed, calibrated raw data;
   calculating a dimensional offset curve or surface using the smoothed, calibrated raw data and the stable reference frame curve by referencing any peaks in the smoothed raw data within a predefined range of a corresponding point in the stable reference frame curve or surface;
   smoothing the dimensional offset curve or surface; and
   outputting the dimensional offset curve or surface for utilization in fabricating the part that is to be adjacent the base part.

2. A computer based method according to claim 1 wherein receiving calibrated raw data which defines the mating surface of the base part comprises:
   scanning an area surrounding a plurality of pilot holes in the base part and scanning a portion of the side walls of the pilot holes, using a scanning device; to define locations of the pilot holes; and
   projecting the scan data relating to the side wall of the holes onto a plane coincidental to the surface of the hole entrances; and
   defining the center of the pilot holes, the diameter of the pilot holes, and data that defines the plane of the entrances of the pilot holes.

3. A computer based method according to claim 1 wherein smoothing the raw data comprises filtering noise out of the raw data to generate a profile that substantially matches peak-to-peak values of the base part surface.

4. A computer based method according to claim 1 wherein generating a stable reference frame comprises:
   receiving the smoothed, calibrated raw data points in cylindrical coordinates;
   converting the smoothed, calibrated raw data points from cylindrical coordinates to Cartesian coordinates;
   grouping the smoothed, calibrated raw data points into sets of data points, each set including a predefined number of the smoothed, calibrated raw data points;
   predicting at least two of a new X, a new Y, and a new Z by fitting a straight line through the smoothed, calibrated raw data points of each set of the smoothed, calibrated raw data points; and
   generating the stable reference frame using the new Xs and the new Ys.

5. A computer based method according to claim 1 wherein calculating a dimensional offset curve comprises comparing the stable reference frame to the smoothed, calibrated raw data points.

6. A computer based method according to claim 5 wherein comparing the stable reference frame to the smoothed, calibrated raw data points comprises:
   finding the distance between a point defined by $x_0=(x_0, y_0)$ and a line defined by two points: $x_1=(x_1, y_1)$ and $x_2=(x_2, y_2)$, according to $$d = \frac{|(x_2 - x_1)(y_1 - y_0) - (x_1 - x_0)(y_2 - y_1)|}{\sqrt{(x_2 - x_1)^2 + (y_2 - y_1)^2}},$$

the two points being an approximation of the stable reference frame using a point on either side of an equivalent point on the stable reference frame; and calculating a local maximum peak height using at least one of an arbitrary range and a mathematical weighted average symmetrically about the data point; and generating the dimensional offset curve according to Offset=F=$d_{max}$+a minimum offset value+f(d), where f(d) is =0.000 if d is less than or equal to a first value and f(d)=is a second value if d is greater than the first value.

7. A computer based method according to claim 6 further comprising:

calculating a move vector for the offset of each point by calculating the slope symmetrically over at least n+1 points on the stable reference frame according to:

$$M_x = \frac{1}{\sqrt{1 + \left(\text{SLOPE}\left\{X_{i-\frac{n}{2},\ldots,i+\frac{n}{2}}, Y_{i-\frac{n}{2},\ldots,i+\frac{n}{2}}\right\}\right)^2}},$$

$$\text{IF}\left|\text{SLOPE}\left\{X_{i-\frac{n}{2},\ldots,i+\frac{n}{2}}, Y_{i-\frac{n}{2},\ldots,i+\frac{n}{2}}\right\}\right| \leq \infty$$

$$M_y = \frac{1}{\sqrt{1 + \left(\text{SLOPE}\left\{Y_{i-\frac{n}{2},\ldots,i+\frac{n}{2}}, X_{i-\frac{n}{2},\ldots,i+\frac{n}{2}}\right\}\right)^2}},$$

$$\text{IF}\left|\text{SLOPE}\left\{Y_{i-\frac{n}{2},\ldots,i+\frac{n}{2}}, X_{i-\frac{n}{2},\ldots,i+\frac{n}{2}}\right\}\right| \leq \infty,$$

where ∞ is approximately equal to 100;

determining which quadrant each point is in; and moving the point according to move vector magnitude for each X and Y according to $X_{shrunk}=(X_{31}-M_xF)$ and $Y_{shrunk}=(Y_- -M_yF)$.

8. A computer based method according to claim 6 wherein calculating a local maximum peak height comprises calculating a local maximum peak height according to $d_{max}$=MAX $(d_{i-n/2}, \ldots, d_{i+n/2})$ n{12, 14, . . . 22}.

9. A computer based method according to claim 1 wherein calculating a dimensional offset curve comprises applying a variable offset when the pre-smoothed raw data exceeds a threshold of variation from the stable reference frame.

10. A computer based method according to claim 1 further comprising defining a surface for a part for manufacture or modification based on the dimensional offset curve or surface.

11. A system for defining a surface of a part for placement adjacent a mating surface of a base part, the surface definition utilized in fabrication of the part, said system comprising:

a database configured to receive and store raw data relating to the surface of the base part; and a computer configured to be coupled to said database, said computer configured to:

receive calibrated raw data which defines the mating surface of the base part and cause the calibrated raw data to be stored in said database;

smooth the calibrated raw data;

generate a stable reference frame consisting of at least one of a substantially smooth curve or surface based on the smoothed, calibrated raw data;

calculate a dimensional offset curve or surface using the smoothed, calibrated raw data and the stable reference frame curve by referencing any peaks in the smoothed raw data within a predefined range of a corresponding point in the stable reference frame curve or surface;

smooth the dimensional offset curve or surface; and store the smoothed dimensional offset curve or surface in said database for utilization in part fabrication.

12. A system according to claim 11 further comprising a scanning device operatively coupled to said computer, wherein to receive and store the calibrated raw data said computer and said scanning device configured to:

scan an area surrounding a plurality of pilot holes in the base part and scan a portion of the side walls of the pilot holes to define locations of the pilot holes;

project the scan data relating to the side wall of the holes onto a plane coincidental to the surface of the hole entrances; and define the center of the pilot holes, the diameter of the pilot holes, and data that defines the plane of the entrances of the pilot holes.

13. A system according to claim 11 wherein to smooth the calibrated raw data, said computer programmed to filter noise out of the raw data and generate a surface profile that substantially matches peak-to-peak values of the base part surface.

14. A system according to claim 11 wherein to generate a stable reference frame, said computer is programmed to:

convert the smoothed, calibrated raw data points to Cartesian coordinates;

group the smoothed, calibrated raw data points into sets of data points, each set including a predefined number of the smoothed, calibrated raw data points;

predict at least two of a new X, a new Y, and a new Z by fitting a straight line through the smoothed, calibrated raw data points of each set of the smoothed, calibrated raw data points; and generate the stable reference frame using the new X, Y, and Z.

15. A system according to claim 11 wherein to calculate a dimensional offset curve, said computer is programmed to compare the stable reference frame to the smoothed, calibrated raw data points.

16. A system according to claim 15 wherein to compare the stable reference frame to the smoothed, calibrated raw data points, said computer is programmed to:

find the distance between a point defined by $x_0=(x_0, y_0)$ and a line defined by two points: $x_1=(x_1, y_1)$ and $x_2=(x_2, y_2)$, according to $$d = \frac{|(x_2 - x_1)(y_1 - y_0) - (x_1 - x_0)(y_2 - y_1)|}{\sqrt{(x_2 - x_1)^2 + (y_2 - y_1)^2}},$$

the two points being an approximation of the stable reference frame using a point on either side of an equivalent point on the stable reference frame; and calculate a local maximum peak height according to $d_{max}$=MAX$(d_{i-n/2}, \ldots, d_{i+n/2})$ n{12, 14, . . . 22}; and generate the dimensional offset curve according to Offset=F=$d_{max}$+0.003 in +f(d), where f(d) is =0.000 if d is less than or equal to a first value and f(d)=is a second value if d is greater than the first value.

17. A system according to claim 15 wherein said computer is further programmed to:

calculate a move vector for the offset of each point by calculating the slope symmetrically over at least n+1 points on the stable reference frame according to:

$$M_x = \frac{1}{\sqrt{1 + \left(\text{SLOPE}\left\{X_{i-\frac{n}{2},\ldots,i+\frac{n}{2}}, Y_{i-\frac{n}{2},\ldots,i+\frac{n}{2}}\right\}\right)^2}},$$

$$\text{IF}\left|\text{SLOPE}\left\{X_{i-\frac{n}{2},\ldots,i+\frac{n}{2}}, Y_{i-\frac{n}{2},\ldots,i+\frac{n}{2}}\right\}\right| \leq \infty$$

$$M_y = \frac{1}{\sqrt{1 + \left(\text{SLOPE}\left\{Y_{i-\frac{n}{2},\ldots,i+\frac{n}{2}}, X_{i-\frac{n}{2},\ldots,i+\frac{n}{2}}\right\}\right)^2}},$$

$$\text{IF}\left|\text{SLOPE}\left\{Y_{i-\frac{n}{2},\ldots,i+\frac{n}{2}}, X_{i-\frac{n}{2},\ldots,i+\frac{n}{2}}\right\}\right| \leq \infty,$$

where $\infty$ is approximately equal to 100;
determine which quadrant each point is in; and
move the point according to move vector magnitude for each X and Y according to $X_{shrunk}=(X_{31}-M_xF)$ and $Y_{shrunk}(Y_{31}-M_yF)$.

18. A system according to claim 11 wherein to calculate a dimensional offset curve, said computer is programmed to apply a variable offset when the pre-smoothed raw data exceeds a threshold of variation from the stable reference frame.

19. A system according to claim 11 wherein said computer is programmed to utilize the stored, smoothed dimensional offset curve or surface in said database to define a surface for a part for manufacture or modification.

20. A computer-based method for manufacturing a part, the part configured for eventual placement against a mating surface of a base part, said method comprising:
performing measurements with a laser displacement device to define the mating surface of the base part;
smoothing the data associated with the measurements;
generating a stable reference frame based on the smoothed measurement data;
calculating a dimensional offset based on the smoothed measurement data and the stable reference frame curve by referencing any peaks in the smoothed measurement data within a predefined or dynamic range of a corresponding point in the stable reference frame;
smoothing the dimensional offset; and
fabricating a part for placement adjacent the mating surface of the base part, a portion of the part defined by the smoothed dimensional offset.

21. A computer-based method according to claim 20 further comprising adding an expected error to the calculated the dimensional offset.

* * * * *